US012434355B2

(12) United States Patent
Hazar

(10) Patent No.: US 12,434,355 B2
(45) Date of Patent: Oct. 7, 2025

(54) HAND TOOL SYSTEMS AND DEVICES AND RELATED METHODS

(71) Applicant: Hazar Enterprises LLC, Draper, UT (US)

(72) Inventor: David Hazar, Draper, UT (US)

(73) Assignee: Hazar Enterprises LLC, Draper, UT (US)

( * ) Notice: Subject to any disclaimer, the term of this patent is extended or adjusted under 35 U.S.C. 154(b) by 302 days.

(21) Appl. No.: 18/067,877

(22) Filed: Dec. 19, 2022

(65) Prior Publication Data

US 2024/0198494 A1 Jun. 20, 2024

(51) Int. Cl.

*B25B 7/22* (2006.01)
*B25B 7/02* (2006.01)
*B25B 7/08* (2006.01)

(52) U.S. Cl.

CPC .................. *B25B 7/22* (2013.01); *B25B 7/02* (2013.01); *B25B 7/08* (2013.01)

(58) Field of Classification Search

CPC .... B25B 7/02; B25B 7/08; B25B 7/22; B25B 5/04; B25B 5/014; B25B 5/16; B25B 13/00; B25B 13/48; B25B 13/58; B25B 23/00; B25B 3/142; B25F 1/02; B25F 1/04

See application file for complete search history.

(56) References Cited

U.S. PATENT DOCUMENTS

| | | | | |
|---|---|---|---|---|
| 4,926,685 A * | 5/1990 | Shannon, Sr. | H01R 43/042 | 81/424 |
| 5,579,667 A * | 12/1996 | Kim | B25B 13/10 | 81/185.1 |
| 9,559,478 B2 * | 1/2017 | Jaramillo | H01R 43/05 | |
| 2003/0172781 A1 * | 9/2003 | Saunders | B25B 13/5058 | 81/119 |
| 2004/0144220 A1 * | 7/2004 | Stoick | B25B 13/02 | 81/471 |
| 2010/0018365 A1 * | 1/2010 | Tyler | B25B 5/163 | 269/280 |

* cited by examiner

*Primary Examiner* — Robert J Scruggs
(74) *Attorney, Agent, or Firm* — Law Office of Paul B. Johnson; Paul B. Johnson

(57) ABSTRACT

Hand tool systems disclosed herein include hand tools including a first rigid member having a first lever and a first jaw, a second rigid member having a second lever and a second jaw, and a pivot rotatingly coupling the first rigid member with the second rigid member. A coupler may comprise a protrusion extending from a sidewall of one of the jaws and/or may comprise a cavity in the sidewall. An attachment includes a void, projection, and/or extension for selectively coupling with the coupler, and includes a recess which may form a shape of half of a regular hexagon. Two attachments may be used, one coupled to each jaw, so that when the hand tool is closed the recesses jointly form a shape of a regular hexagon. In implementations the jaws have protrusions integrally formed therewith, instead of selectively couplable attachments, which include recesses.

10 Claims, 9 Drawing Sheets

HAND TOOL SYSTEMS AND DEVICES AND RELATED METHODS

BACKGROUND

1. Technical Field

Aspects of this document relate generally to hand tools.

2. Background Art

Hand tools are used in a variety of circumstances. Pliers, wrenches, and the like are used to hold and remove/install items. Such tools are generally operated by a user's hand, such as by gripping the tool and applying pressure along one or more directions, moving the tool along one or more directions, and/or rotating the tool in one or more directions. Hand tools are used in various industries including vehicle repair, home installation and repair, manufacture and repair of a variety of devices, and so forth.

SUMMARY

Implementations of hand tool systems may include: a hand tool including: a first rigid member having a first lever and a first jaw; a second rigid member having a second lever and a second jaw; a pivot rotatingly coupling the first rigid member with the second rigid member; a coupler including a protrusion extending from a sidewall of one of the jaws and/or a cavity in the sidewall; and an attachment configured to selectively couple with the coupler, the attachment having a recess.

Implementations of hand tool systems may include one or more or all of the following:

The recess may form a shape of half of a regular hexagon.

The coupler may include the protrusion, and the attachment may include a void having a shape matching a shape of the protrusion.

The protrusion may form a polygonal shape.

The hand tool system may include an extension having a hollow and a projection, the hollow having a shape matching a shape of the protrusion, and the shape of the projection matching the shape of the void.

The coupler may include the cavity, and the attachment may include a projection having a shape matching a shape of the cavity.

The cavity may form a polygonal shape.

The coupler may include the cavity, the attachment may include a void, and the hand tool system may include an extension having a first projection and a second projection, the first projection having a shape matching a shape of the cavity, and the second projection having a shape matching a shape of the void.

The coupler may include the protrusion, the attachment may include a second recess, and the protrusion and the attachment may be magnetically attracted such that they are configured to magnetically couple with one another until separated by manual force.

The hand tool system may include an extension configured to couple with the coupler and with the attachment. The extension may include a plurality of bends offsetting a portion of the attachment such that no straight line passing through terminal ends of the attachment would pass through the portion.

The recess of the attachment may include a plurality of teeth.

At least one of the teeth may be at least partially formed of a polymer.

At least one of the teeth may include a clamping edge and a raised portion extending from the clamping edge. The raised portion may be configured to contact a bottom of a nut while the clamping edge is contacting a side of the nut.

The hand tool system may include a retaining member slidingly coupled with the attachment and configured to be locked at multiple positions using a tightening member.

Implementations of hand tool systems may include: a hand tool including: a first rigid member having a first lever and a first jaw; a second rigid member having a second lever and a second jaw; a pivot rotatingly coupling the first rigid member with the second rigid member; a first coupler including a protrusion extending from a sidewall of the first jaw and/or a cavity in the sidewall of the first jaw; a second coupler including a protrusion extending from a sidewall of the second jaw and/or a cavity in the sidewall of the second jaw; a first attachment configured to selectively couple with the first coupler, the first attachment including a recess; and a second attachment configured to selectively couple with the second coupler, the second attachment including a recess.

Implementations of hand tool systems may include one or more or all of the following:

The first attachment and the second attachment may be rotatingly coupled together with a second pivot. The recesses may each form a shape of half of a regular hexagon such that when the attachments are coupled with the couplers, and when the hand tool is closed, the recesses jointly form a shape of a regular hexagon.

Implementations of hand tool systems may include: a hand tool including: a first rigid member having a first lever and a first jaw; a second rigid member having a second lever and a second jaw; a pivot rotatingly coupling the first rigid member with the second rigid member; and a protrusion extending from a sidewall of the first jaw and having a recess, recessed from a flat surface, forming a shape of half of a regular hexagon.

Implementations of hand tool systems may include one or more or all of the following:

The protrusion may be integrally formed with the jaw and may not be manually removable therefrom.

The protrusion may be selectively manually removable from the first jaw and may form a removable attachment.

The removable attachment may include a clamp including: a pair of extensions distanced sufficiently from one another to receive the first jaw therebetween; and a tightening member configured to be rotated to secure the removable attachment to the first jaw.

General details of the above-described implementations, and other implementations, are given below in the DESCRIPTION, the DRAWINGS, the CLAIMS, and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

DESCRIPTION

Figure 1:
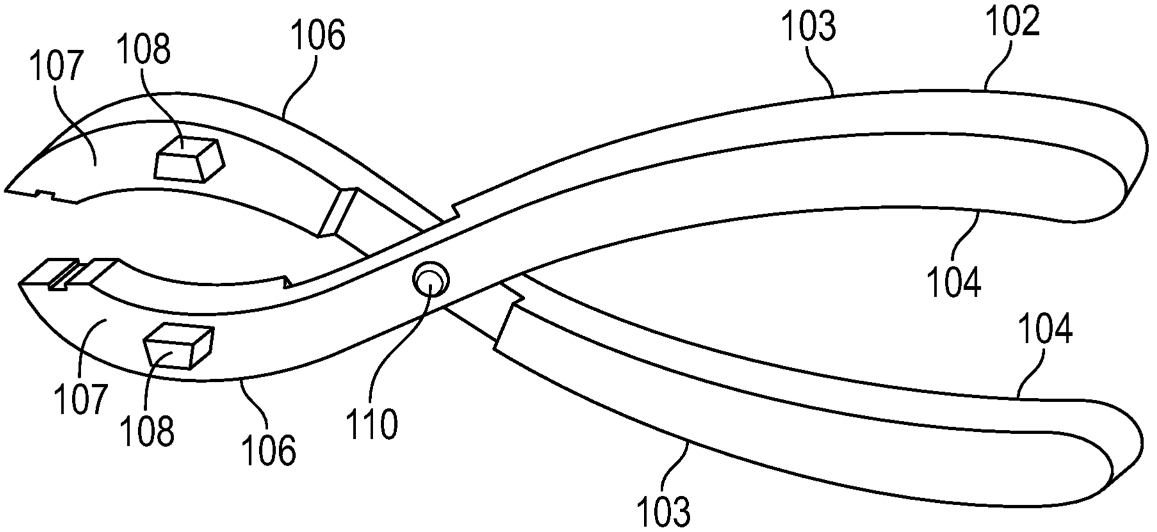
FIG. 1 is a front, top, side view of an implementation of a hand tool of the hand tool system of FIG. 3.

Implementations/embodiments disclosed herein (including those not expressly discussed in detail) are not limited to the particular components or procedures described herein. Additional or alternative components, assembly procedures, and/or methods of use consistent with the intended hand tool systems and devices and related methods may be utilized in any implementation. This may include any materials, components, sub-components, methods, sub-methods, steps, and so forth.

Hand tool systems and implementing components are described herein which solve a variety of existing problems.

One problem with existing pliers, for example, is that when the item you want to grip is right against a hard flat surface it is almost impossible to get a firm grip on the object due to the fact that your fingers need to grip the handles and force you to angle the pliers. While there are existing angled pliers, they do not allow the same amount of torque and force to be exerted on the item you are trying to turn with the pliers and are extremely awkward to rotate while maintaining pressure on the gripped item. Another deficiency is that existing pliers do not offer any customizability and it is required that users purchase many different existing pliers for different use cases. Finally, existing pliers are generally flat or ridged-flat where they grip and this is not the best shape for gripping objects as there is less surface area contact and nothing to keep the tool from slipping off the object they are gripping. They also generally do not have a lip or edge to aid in gripping the backside of objects if those objects are not straight like the head of a screw or bolt.

Hand tool systems disclosed herein, on the other hand, form or have an offset deep enough to create space for fingers to grip tool handles. In some cases the jaws of a hand tool have protrusions from one or both sides, with attachments coupled thereto of sufficient length to allow the user to grip the handles while maintaining the pliers in a straight line and while the attachments are gripping an item to be rotated or removed. One potential use case would be to grip a stripped screw or bolt. The hand tool systems and implementing components disclosed herein allow the user to exert more force on the stripped screw or bolt than otherwise possible.

It is pointed out that, while the hand tool systems disclosed herein may be used to rotate an item, they may also in implementations be used to simply grip an item and pull it straight out of some location without any rotational movement.

Instead of removable attachments, some hand tool system could simply include protrusions or projections extending from jaw sidewalls but which are fixed and not removable. This may be useful for allowing even tighter gripping in some implementations, though the user may need more hand tool systems in such a situation, with varying recess shapes and sizes, as opposed to having a variety of attachment types and attachment sizes.

Where removable attachments are used, a variety of attachments may be coupled with protrusions or other couplers of the hand tool jaws to change the shape or material used for gripping the nut or threaded fastener head. This may allow use of the same hand tool system for different workloads or circumstances. For instance, there could be attachments that are different sizes and shapes and have teeth of different materials for gripping stripped screws or bolts of varying sizes. The protrusion, cavity, or other coupler of the jaw for attaching different attachment types (of different sizes, shapes, and materials) could be any shape that allows the attachments to slide on or in or over (or in any other way attaches to) the hand tool jaws. Some non-limiting examples are protrusions or cavities of the jaw having square, trapezoid, triangle, or half-moon shapes (from a two-dimensional perspective, with corresponding three-dimensional shapes from a three-dimensional perspective).

Hand tool systems disclosed herein may also have fixed or adjustable pieces on the protruding portions of hand tool jaws (such as for fixed attachments or protrusions), or on removable attachments, that can grab the back part of the object being gripped to prevent the hand tool from slipping off the object when turning or pulling on the hand tool. For instance, when loosening a screw or bolt with a ratchet, if you twist the ratchet the wrong way, the ratchet will disconnect from the bolt. For hand tools which have an opening and closing mechanism, a thin lip (fixed or adjustable) could be added to an end of a protruding portion of a jaw or removable attachment coupled to a jaw so that when applying force to the screw or bolt, the lip would lodge behind the screw or bolt to minimize the chances of the hand tool slipping off the screw or bolt. Another option would be to have blades that attach to fixed protrusions or to removable attachments and which can slide back and forth and be tightened (such as on a backside, opposite the blade, with wing nuts or in some other way).

Accordingly, hand tool systems disclosed herein may be useful for removing stripped or non-stripped screws or bolts, for tightening stripped or non-stripped bolts, and for gripping, moving, and/or removing other objects in a variety of settings.

Figure 2:
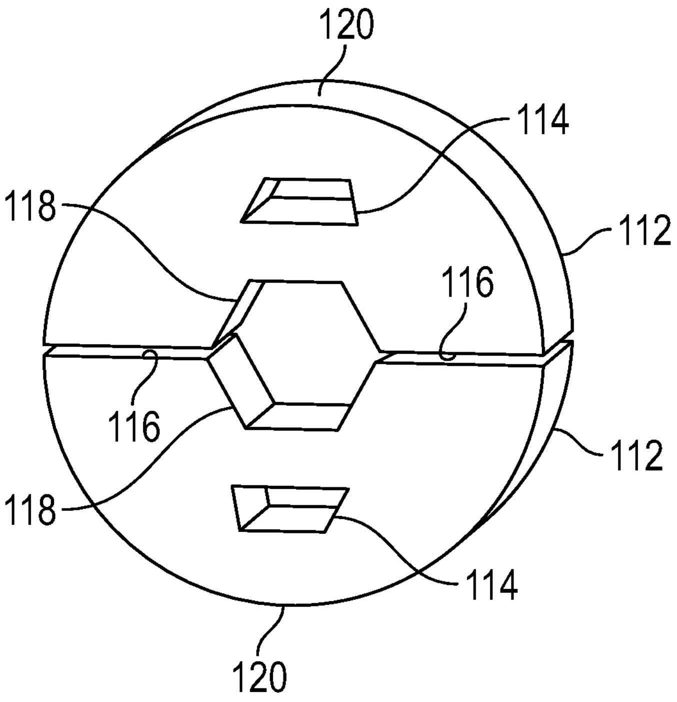
FIG. 2 is a front, top, side view of an implementation of an attachment of the hand tool system of FIG. 3.
Figure 3:
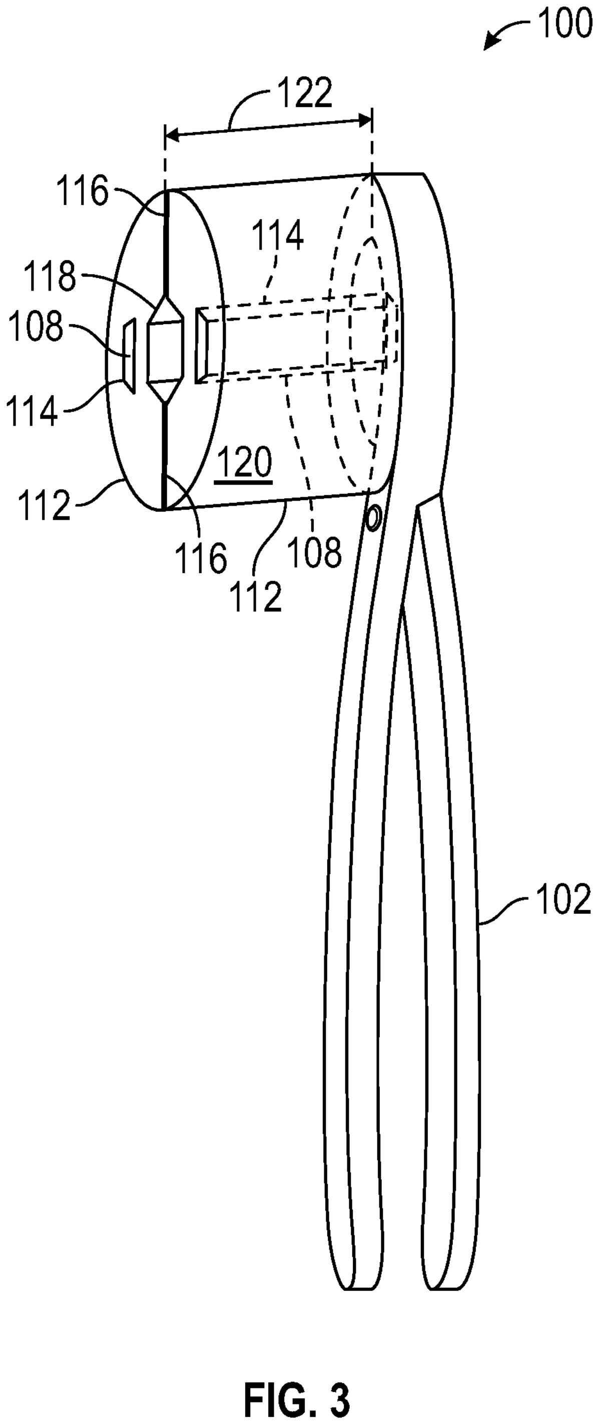
FIG. 3 is a front, top, side view of an implementation of a hand tool system.

Referring to FIGS. 1-3, a first implementation of a hand tool system (system) 100 is shown, along with implementing components. The hand tool system includes a hand tool 102. The hand tool includes a pair of rigid members 103, each rigid member forming a lever (or handle) 104 and a jaw 106. The two rigid members are rotatingly joined or coupled together using a pivot (or fulcrum) 110. The hand tool of FIGS. 1-3 includes or forms pliers. The levers, jaws, and pivot or fulcrum may have configurations other than those shown in the drawings, though. For example, the hand tool could include or could form slip-joint pliers, diagonal pliers (side cutters), crimping pliers (crimpers), lineman's pliers, needle-nose pliers, bent nose pliers, pincers, tongue-and-groove pliers (channel-lock pliers), locking pliers, a plier wrench, a wrench, a locking wrench, and so forth. The hand tool may be formed of a metal or metal alloy, as non-limiting examples, and may include polymer coatings on the handles which may be applied by dipping the handles into a molten polymer and allowing liquid polymer thus coated on the handles to solidify. Such polymer coatings are useful to add grip and to provide some electrical insulation between the hand tool and the user's hand. In other implementations the polymer coating may be excluded, an in any case the handles may include a surface texture that facilitates gripping by a user's hand.

In the implementation of FIGS. 1-3 each jaw includes a coupler 108 extending from a sidewall 107 of the jaw. Each coupler of FIGS. 1-3 is a protrusion which extends perpendicularly from the sidewall and has a shape of a three-dimensional trapezoid (i.e., a trapezoidal prism). In other implementations other regular three-dimensional polygonal, irregular three-dimensional polygonal, or any other regular or irregular three-dimensional shapes could be used so long as the shape of the coupler prevents an attachment from rotating thereon. Although the coupler is seen to have the three-dimensional shape of a trapezoidal prism (which itself is a regular polygonal prism, or in other words a three-dimensional shape formed by two translated regular polygons connected by rectangles), the couplers can also be said to have or to form a shape of a trapezoid, or of a polygon, since each three-dimensional trapezoidal prism includes the shape of at least two two-dimensional trapezoids and each three-dimensional polygonal prism likewise includes the shape of at least two two-dimensional polygons in addition to the aforementioned rectangles. But, as indicated, other shapes are possible so long as the shape prevents rotation of an attachment, which attachment will be discussed hereafter.

Each coupler may be integrally formed with the rigid member. For example, each rigid member could be formed using forging, casting, milling, or another fabrication technique, and the coupler could be integrally formed, extending from the jaw sidewall, during this manufacturing process. In other implementations a coupler could be formed separately and could be welded or otherwise melt-bonded to the sidewall—such permanent couplings falling within the definition herein of "integrally formed"—in other words any coupler which is not manually removable from a jaw may be considered to be "integrally formed" with the jaw. Apart from the couplers, the hand tool may otherwise be any of a variety of standard hand tools (such as any of the plier types, wrench types, or other tool types discussed above, or so forth).

The hand tool system of FIGS. 1-3 includes a pair of attachments 112. Each attachment includes a void 114 for receiving a coupler 108. Each void is accordingly seen as having the same shape and orientation as one of the couplers 108—that of a regular trapezoidal prism. Each void could be sized slightly larger than the corresponding coupler 108, or about the same size, or even slightly smaller—but in any case a friction fit is obtained when the attachment is pressed onto the coupler joining the void and coupler. In some implementations the void and/or coupler may include a biased friction ball (as is common in the hand and power tool industries), or another biasing element, to facilitate a friction fit between the attachment and coupler.

Each attachment includes a recess 118 in a first surface 116. In the drawings the first surface 116 is a flat surface. In other implementations it may be substantially flat. The term "substantially" as used herein means having at least 90% of the stated characteristic, which in this case would be 90% of the surface area of the first surface being flat. The recess is seen to form a shape of half of a regular hexagon, from a two dimensional perspective, and a shape of half of a regular hexagonal prism from a three-dimensional perspective. This shape configuration is useful because when two attachments are coupled to the hand tool, as in FIG. 3, then when the tool is in the closed position (i.e., the terminal ends of the jaws touching as in FIG. 3, as opposed to an open position wherein the terminal ends of the jaws are not touching) the two voids jointly form a shape of a regular hexagon, from a two-dimensional perspective, and a shape of a regular hexagonal prism from a three-dimensional perspective. Many bolt heads, screw heads, nuts, and the like have a regular hexagonal shape, from a two dimensional perspective, and a regular hexagonal prism shape from a three-dimensional perspective. Thus, configuring the voids such that when joined they form a regular hexagonal prism makes the void especially useful to receive or grip onto nuts and heads of threaded fasteners.

The hand tool system may be useful for removing hard-to-extract bolts, screws, other fasteners, and so forth. For example, some bolt or screw heads may be in a location with very small clearance such that there is insufficient space to position a traditional ratchet and socket to tighten/install or loosen/remove the corresponding bolt or screw or other threaded fastener or the like. In such cases, the length 122 of each attachment may be such that the hand tool system fits where a ratchet and socket would not fit, to allow for tightening and loosening of the fastener, as desired. The length 122, however, may be configured to be any desired length, depending on the scenario or use case.

There are other settings in which hand tool system 100 may be useful. In some cases the nut or fastener head may be somewhat stripped such that the correct socket size slips during tightening or loosening of the fastener. The next size down, however, may be too small to receive the nut or fastener head. In such a situation the hand tool system may be useful because the user can use attachments having voids that combine to form the next size down from the correct size, and the user can manually clamp down on the nut or fastener head to provide some grip. The smaller size of the voids, and the manual clamping, may prevent the hand tool from slipping while rotating the nut or fastener head for tightening or loosening it.

Attachments may have voids which combine to form the same sizes as are common in hex sockets, including metric sizes/increments and inch sizes/increments (such as SOCIETY OF AUTOMATIVE ENGINEERS or SAE sizes). A hand tool system may be sold as a kit which includes attachments having a variety of void sizes, matching common hex socket sizes or the like, and/or attachments having a variety of lengths (and some void sizes could be the same among attachments of differing lengths for different scenarios/uses), and so forth.

The use of a joint void, formed from two attachments, which forms a shape similar to a hex socket cavity, is just one example. The two voids of the attachments could instead combine to form a shape of a star socket (such as identical or similar to an E-TORX socket), a deep socket such as for extracting spark plugs, a bolt grip socket or bolt or nut extractor socket, a six-point socket, a twelve-point socket, and any other socket type or shape. In short, the voids may combine to form any shape for any specific end use. Additionally, while the above use-cases describe using the hand tool systems for tightening or loosening fasteners such as bolts or screws, the same functionality applies to nuts as well, such that the hand tool systems may be used to tighten and loosen nuts and other items.

While the first surface 116 is flat, a second surface 120 of each attachment is rounded such that when two attachments are in a closed configuration, as in FIG. 3 with the two first surfaces 116 contacting one another (as opposed to an open configuration where the two first surfaces are not touching one another), the two second surfaces 120 jointly define a cylindrical sidewall. In implementations this is useful so that, as the hand tool is rotated during a tightening or loosening action when the hand tool is in a closed configuration, the attachments have no items or portions projecting outward from the cylindrical sidewall such that might catch on something and prevent further rotation in a desired direction. That being said, other shapes are possible for the second surface for instances wherein such catching is unlikely or is not possible.

It is useful for each attachment to not rotate relative to the jaw it is coupled to. To this end, the couplers/protrusions 108 are not circular or cylindrical and are not any other shape which would allow rotation of the attachment thereon. Disallowing rotation allows the attachments to more tightly grip a nut or fastener head or other element for tightening or loosening. That being said, the couplers 108 could have shapes that allow rotation in circumstances wherein rotation of the attachment either is not disadvantageous or provides some actual advantage, such as allowing some leeway/rotation of the attachments to get them coupled to a nut or fastener head that is in a position such that having fixed positions for the attachment relative to the jaw makes such coupling more difficult or impossible.

While system 100 includes two attachments 112, one for each jaw, it is also possible to form a single attachment which has the shape of two attachments 112 combined (for example a single attachment having two voids for coupling with the two couplers 108 and having a single hex cavity or other cavity type such as the other types described herein, and so forth). In such implementations the user would not be able to use the clamping motion of the hand tool to grip down on the nut or fastener head, but the size and shape of the hand tool system may nevertheless allow the user to reach places that are hard or impossible to reach with a ratchet and socket.

It is also pointed out that, while ratcheting wrenches exist in the art, which are narrower than ratchet and socket combinations and can therefore fit in places where a ratchet and socket cannot, nevertheless such ratcheting wrenches do not allow a gripping mechanism whereby a user can intentionally pick a cavity size smaller than the nut or fastener head and grip down on the nut or fastener head for tightening or loosening. Additionally, a ratcheting wrench still requires clearance to put the ratcheting wrench on the nut or fastener head, and to remove it, by a motion upwards from (or downwards toward) the nut or fastener head. The hand tool systems described herein, however—at least those in which two separate attachments are used—allow the user to couple the attachments to a nut or fastener head using a side motion, as opposed to an up or down motion. This means less clearance above the nut or fastener head may be required, so that the hand tool systems disclosed herein may be able to operate in locations with even less clearance above the fastener head or nut than would be required to use a narrow ratcheting wrench. Additionally, by using various lengths 122 of attachments (or various lengths of extensions, which will be described hereafter), the user may be able to select a length 122 which allows just enough clearance proximate the handles for the user to rotate the hand tool without the user's hand(s) (or the handles themselves) running into something, or blocking rotation, or risking injury to the user's hand(s), or the like. Such length adjustment is not possible with ratcheting wrenches.

Figure 4:
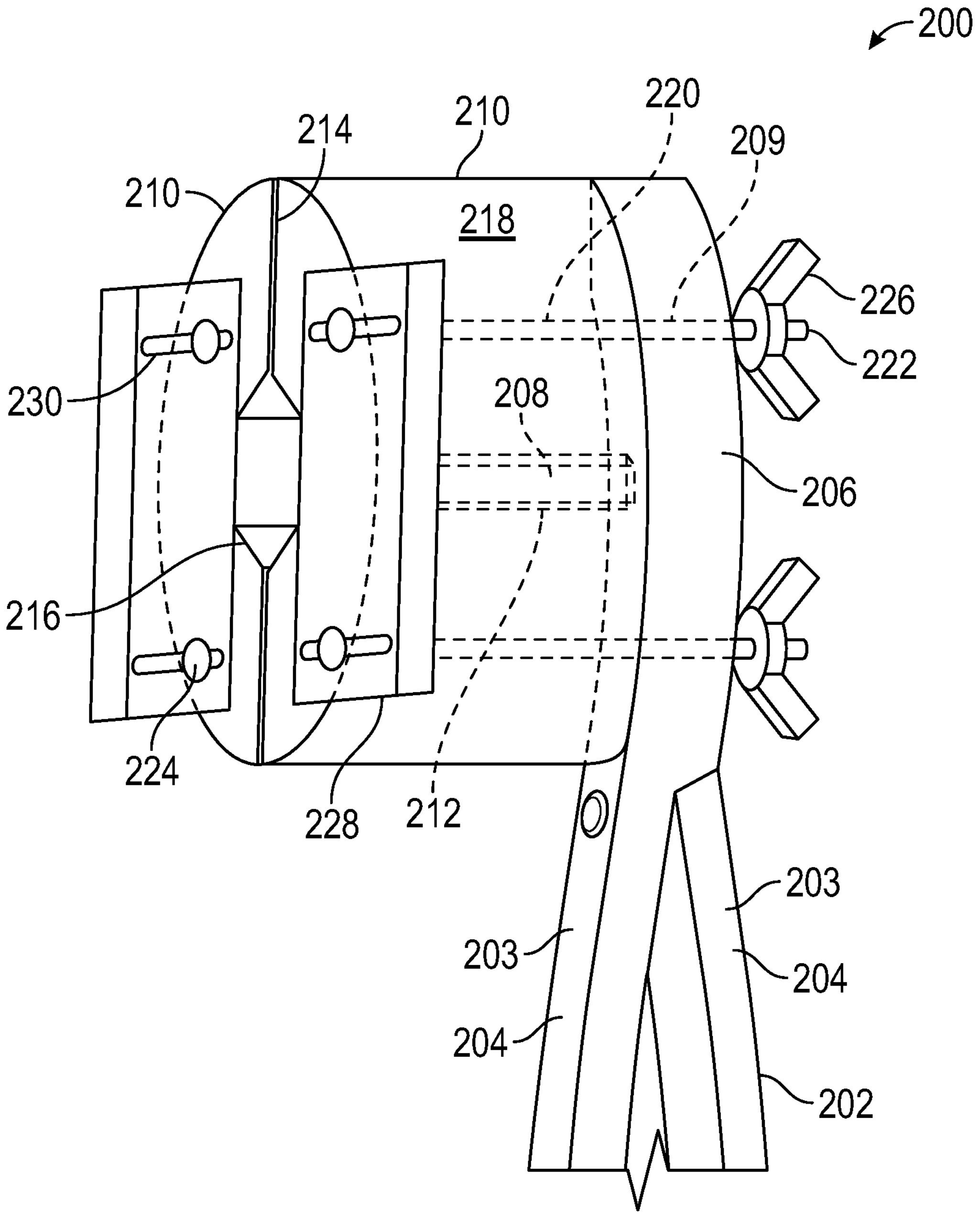
FIG. 4 is a front, top, side, partial view of an implementation of a hand tool system.

FIG. 4 shows an implementation of a hand tool system 200. This is in many ways similar to system 100, but is different in some ways. This hand tool system includes a hand tool 202 which includes a pair of rigid members 203. Each rigid member includes a handle or lever 204 and a jaw 206. The two rigid members are rotatingly joined or coupled together using a pivot or fulcrum. Each jaw includes a coupler 208 extending from the jaw's sidewall. The coupler 208 of each jaw is a protrusion shaped similarly to protrusion 114 of hand tool 102. Each jaw 206 differs from a jaw 106 in that each jaw 206 has a pair of passages 209 passing therethrough (from one sidewall to an opposite sidewall). Hand tool system 200 includes a pair of attachments 210. Each attachment 210 is in some ways similar to an attachment 112. For example, each has a void 212 (for coupling/attaching to a protrusion/coupler 208), a flat or substantially flat first surface 214, a recess 216 which forms a shape of half of a regular hexagon (from a two-dimensional perspective) or half of a regular hexagonal prism (from a three-dimensional perspective), and a second surface 218 which is rounded or circular such that when two attachments are in a closed position the two second surfaces form a cylindrical sidewall. Attachment 210 differs from attachment 112 in that each attachment 210 includes a pair of passages 220.

The passages 209 and 220 are useful for passing bolts 222 therethrough. A retaining member 228 is coupled at the end of each attachment. Each retaining member includes one or more openings 230 (which in the drawing are slits). After a retaining member is coupled at the end of an attachment, and the bolts are passed through from the same end, the heads 224 of the bolts can hold the retaining member at a desired position once tightening members 226 (which in the drawing are wingnuts) are used to tighten the bolt heads against the retaining member. As indicated, the openings 230 are slits, which allows the user to loosen the tightening members, adjust the retaining members to other positions, and re-tighten the tightening members to secure the retaining members at those positions. Although the bolts are shown passing through from one side, in some implementations they could be passed through the other side (with the wingnuts against the blades instead of against the hand tool jaws) if such a configuration provides for proper clearance and spacing to achieve a tightening or loosening movement.

The retaining members are useful in that they can be secured behind or under a nut or head of a threaded fastener that is being tightened or loosened. In some implementations, for example, a retaining member may be able to keep the hand tool assembly coupled to the nut or head of a fastener and may keep the hand tool assembly from sliding off or the like. It may also provide for a force to be applied directly in the removal direction (as opposed to only in rotation directions), which may be useful for some removal operations. The retaining members may also be useful to keep the hand tool assembly coupled with a nut or head of a fastener (to keep it from slipping off or the like) during installation operations, as well. For example, in some implementations a user may want to start threading a nut onto a bolt for installation of the nut, but the positioning may be such that gravity or positioning or movements might easily cause the nut to fall or otherwise not begin threading on the bolt. In such instances the retaining members may keep the bolt securely coupled within the voids of the attachments while the user makes one or more attempts to start threading the nut onto the bolt. And, in general, in any implementations wherein a tightening or loosening rotation is difficult because positioning or gravity or anything else tends to cause the attachments to slide off the nut or fastener head or the like, the retaining members may help to prevent this from happening so that the tightening or loosening operation is more easily accomplished.

In implementations the retaining members may be blades, such as utility razor blades. The retaining members may not have two openings 230 each, but could each only have a single opening 230 (which may or may not form a slit) and, in such implementations, the hand tool system may have only one bolt and tightening member for each blade. In such implementations the surface of the attachment that abuts the blade may be indented where the blade resides to keep the blade secured while still allowing some movement back and forth along the slit—or some other mechanism may keep the blade from rotating if only a single opening 230 is included in each blade. For example the bolts 316 could be carriage bolts (and the passages 220 designed to receive carriage bolts) such that the square or rectangular portion (or other shaped portion preventing rotation) of each bolt prevents the retaining member from rotating, due to sides of the opening 230 abutting the square or rectangular (or other shaped) portion in such a way as to prevent rotation. In some implementations the retaining members may not be blades, but may simply be metallic, rigid polymer, ceramic, composite, or other materials formed into shapes identical or similar to that which is shown in FIG. 4. In other words, there may be a permanent small lip or protrusion or the like formed by a blade-like element which is not separate from the attachment but which is integrally formed therewith. Although this element is called a blade or is called blade-like in implementations, it need not have a sharpened edge configured for cutting, but may instead be dull enough on all edges so as to not cut anything, if desired.

It is pointed out that, for ease of viewing other elements, some elements are intentionally not shown in FIG. 4. For example, only one of the jaws is shown, only one of the voids 212 is shown, and only one of the couplers 208 is shown, although there are actually two of each of these elements. Further, only two passages 220, only two bolts 222, and only two tightening members 226 are shown, although there are actually four of each of these elements. It is also pointed out that, because hand tool system 200 already includes bolts 222 which pass through both the blade and the attachment, in implementations the coupler 208 and void 212 could simply be excluded altogether. In such implementations, having two bolts passing through each attachment keeps the attachments from rotating relative to the jaws. Alternatively, a single threaded fastener could be used for each attachment and recesses in the attachment and jaw may snugly receive the fastener head (or carriage bolt portion of the fastener head) and nut, respectively—or vice versa—to prevent rotation of the attachment relative to the jaw). Additionally, in implementations the blades could be excluded (such as in instances wherein no blade is needed), and the attachments 210 could be attached to the hand tool simply by virtue of the bolts 222 and tightening members 226. In implementations the bolt heads 224 may be very thin so as to not be obtrusive—for example as thin as the blades, or thinner—so long as they are strong enough to secure the blade to the attachment and/or the attachment to the hand tool.

Figure 5:
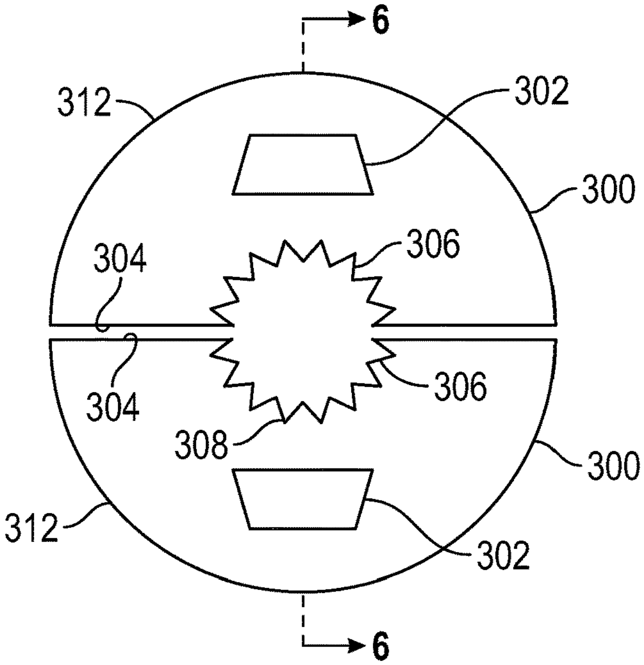
FIG. 5 is a front view of an implementation of an attachment of a hand tool system.
Figure 6:
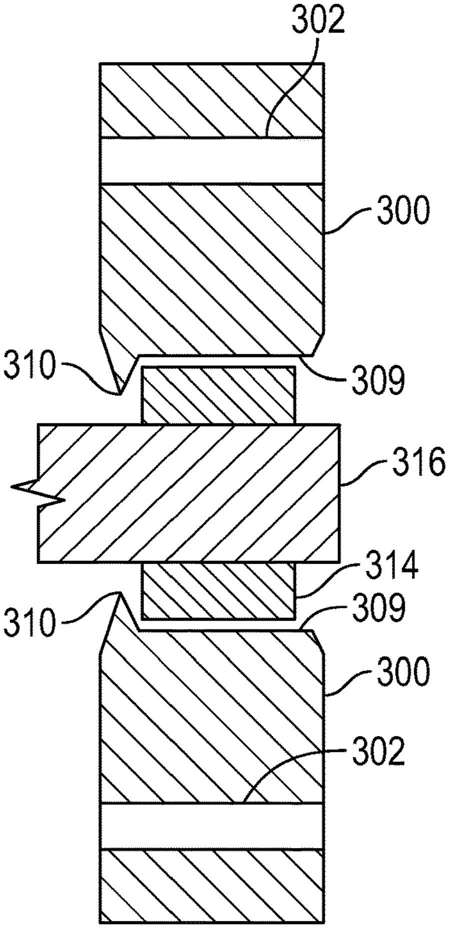
FIG. 6 is a side cross-section view of the attachment of FIG. 5 taken along line 6-6, along with a cross-section view of a bolt and nut.

FIGS. 5-6 show implementations of attachments 300. Attachments 300 are similar in some ways to attachments 112, each having a void 302 for receiving protrusions/couplers 108. Each attachment 300 includes a first surface 304, which may be flat, and a recess 306 recessed from the first surface. Each attachment 300 also includes a second surface 312, which may be rounded such that when the first surfaces of two attachments 300 abut one another the second surfaces 312 form a shape of a cylindrical sidewall. The recess 306 is different from the recess of above-described attachments in that it includes teeth 308 instead of forming a shape of half of a regular hexagon.

FIG. 6 is a simplified side cross-section view of two attachments 300 along with a bolt 316 and nut 314, taken along line 6-6 of FIG. 5. These are shown in simplified format—for example the bolt and nut have threads but these are not shown, and the cross-section view represents a thin slice of each component at a middle thereof (as opposed to fully representing half of each element viewed from a middle cross-sectional cut). The elements are, additionally not necessarily drawn to scale (and the bolt and nut are shown in FIG. 6 although they are not present in FIG. 5). The simplified cross-section view of FIG. 6 reveals that each tooth 308 includes a clamping edge 309 and a raised portion 310 on at least one or more of the teeth. The raised portion is raised upward from the clamping edge. As can be envisioned by viewing FIG. 6, the raised portion is configured to contact a bottom of the nut while the clamping edge is contacting a sidewall of the nut. The raised portion(s) may accordingly help to grip the nut such that the attachment does not slip/slide off the nut during a tightening or loosening operation. In some implementations each tooth includes a raised portion. In other implementations only every other tooth, or only some of the teeth in some regular or irregular pattern (or in a pattern-less manner) includes a raised portion. For example in some implementations only three or four of the teeth (equally spaced, or otherwise, around the recess) may have a raised portion, or a third or quarter of the teeth, or so forth. In some implementations the raised portions are not needed and may be excluded, so that none of the teeth have raised portions. Although the raised portions are discussed as being able to secure to the back of a nut, they similarly can secure to the back of a threaded fastener head, while the clamping edges secure to the side of the threaded fastener head, for similar gripping for tightening/loosening operations.

FIG. 5 shows that the teeth are generally arranged in a circular relationship relative to one another. In other implementations the teeth of each attachment could be organized to form a general shape of a regular half hexagon so that when two attachments 300 are brought together in a closed configuration the teeth are seen arranged in a general shape of a regular hexagon. In other implementations the teeth of any attachment 300 (or of any two attachments 300 brought together in a closed configuration) could be organized or configured to form any regular or irregular shape, polygonal or otherwise.

Each tooth terminates in a clamping edge so as to provide a way for the teeth to clamp tightly onto a bolt or head of a threaded fastener or the like. The user may use the handles of a hand tool to clamp the clamping edges tightly down on an element so that the teeth begin to dig into the element, so that the element can be tightened or loosened, as desired. The teeth may be formed of an extremely hard material to accomplish this—such as a hardened steel, tungsten, titanium, or a hard composite or ceramic material. High hardness may help the teeth to dig in and get some purchase on a nut or fastener head so that rotation of the hand tool in the closed configuration rotates the nut or fastener head. This may be useful for nuts or fastener heads which have become stripped, or the like, so that a regular hex socket (or some other socket or attachment recess shape) is ineffective for tightening or loosening. On the other hand, in some implementations the teeth may be formed of a polymer, such as a durable rubber or the like, so that the teeth intentionally elastically deform some when clamped down on a nut or fastener head, so as to provide friction between the deformed polymer and the nut or fastener head to allow for effective tightening and/or loosening. The teeth could alternatively be formed of other materials. Different recess sizes and/or teeth sizes may be used for different sizes of nuts or fastener heads. Attachment 300 and its teeth may be useful for nuts or fastener heads which are stripped but may also be useful for fastener heads which have a rounded shape instead of a polygonal shape—such as a round screw head or a round bolt head with no screwdriver insert or with a stripped screwdriver insert, as non-limiting examples.

Figure 7:
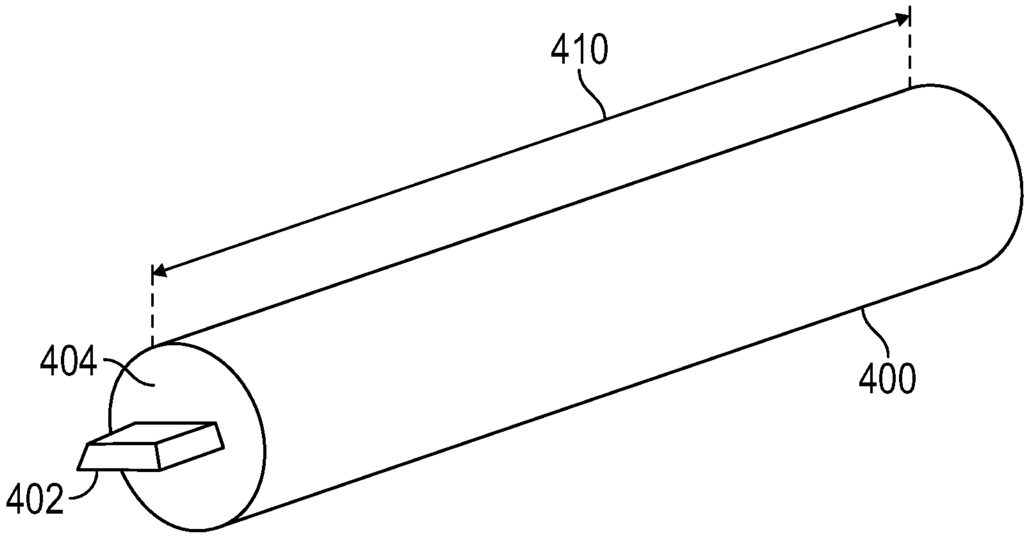
FIG. 7 is a front, top, side view of an implementation of an extension of a hand tool system.
Figure 8:
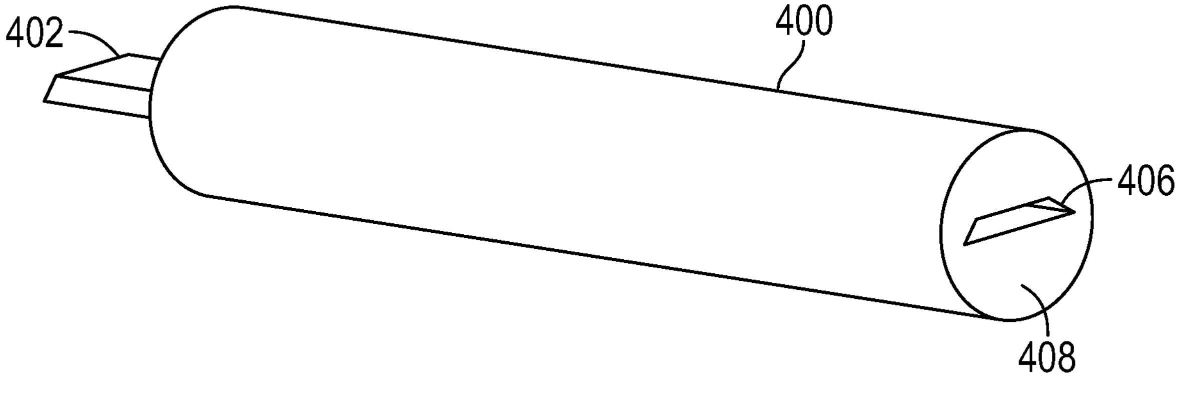
FIG. 8 is a front, bottom, side view of the extension of FIG. 7.

FIGS. 7-8 show an example of an extension 400. The extension includes a projection 402 on one end and a hollow 406 on the other. The projection is sized and shaped to couple with the void 114 of attachment 112 (or a similar void of another attachment) so that the attachment can be selectively attached to the extension. It accordingly forms a regular trapezoid shape (from a two-dimensional perspective) or a regular trapezoidal pyramid shape (from a three-dimensional perspective). The hollow forms essentially the same shape(s) and is configured to couple with the coupler/protrusion 108 of hand tool 102 (or a similar coupler/protrusion of another hand tool) so the extension can be selectively attached to the hand tool. The extension has a length 410 and is configured to allow the user to use the attachment(s) in hard to reach places, such as those which cannot be accessed/reached (or cannot be easily accessed/reached) without such an extension. Different extensions 400 can have different lengths 410, for varying uses, and two or more extensions 400 could be joined together (the projection of one extension coupled with the hollow of another, for example) for achieving a longer length. The diameter of the cylindrical portion of the extension may be modified as desired for different uses, and the cylindrical portion could also have some other shape such as a rectangular prism, a triangular prism, or any other three-dimensional polygonal prism or other regular or irregular shape.

Stops 404 and 408 are included proximate ends of the extension (in FIGS. 7-8 they are at ends of the cylindrical portion). When an attachment is coupled with projection 402 (or a projection of any other attachment or other element) the stop 404 prevents the attachment or other element from going further beyond the stop. Similarly, when a coupler/protrusion 108 of hand tool 102 (or any coupler/protrusion of another hand tool or other element) is inserted into hollow 406 the stop 408 prevents the hand tool or other element from going further beyond the stop.

The projections 402 and hollows 406 can have any shape as desired, such as any shapes otherwise described herein for attachment voids/protrusions or jaw couplers/protrusions/voids.

Figure 10:
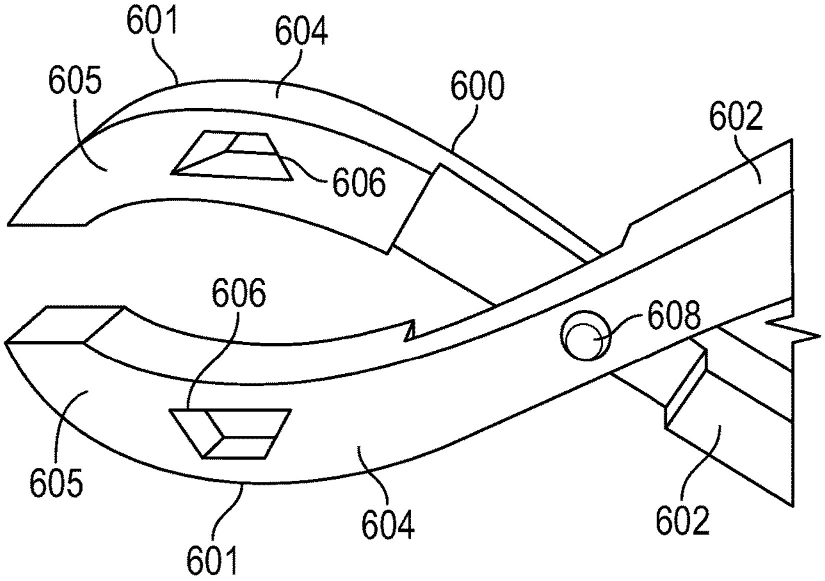
FIG. 10 is a front, top, side view of an implementation of a hand tool of a hand tool system.

In implementations the configuration described above could be reversed. For example, instead of a protrusion the coupler 108 could be a void, and instead of a void 114 attachment 112 could include a protrusion. In such an implementation the projection 402 of the extension could be selectively attached to the void of the hand tool and the hollow 406 of the extension could be selectively attached to the protrusion of the attachment. A hand tool 600 for such a configuration is shown in FIG. 10. Hand tool 600 includes a pair of rigid members 601, each having a lever or handle 602 and a jaw 604. The rigid members are rotatingly joined together using a pivot of fulcrum 608. The sidewall 605 of each jaw has a coupler 606 therein, but instead of a protrusion each coupler 606 is a cavity.

Figure 13:
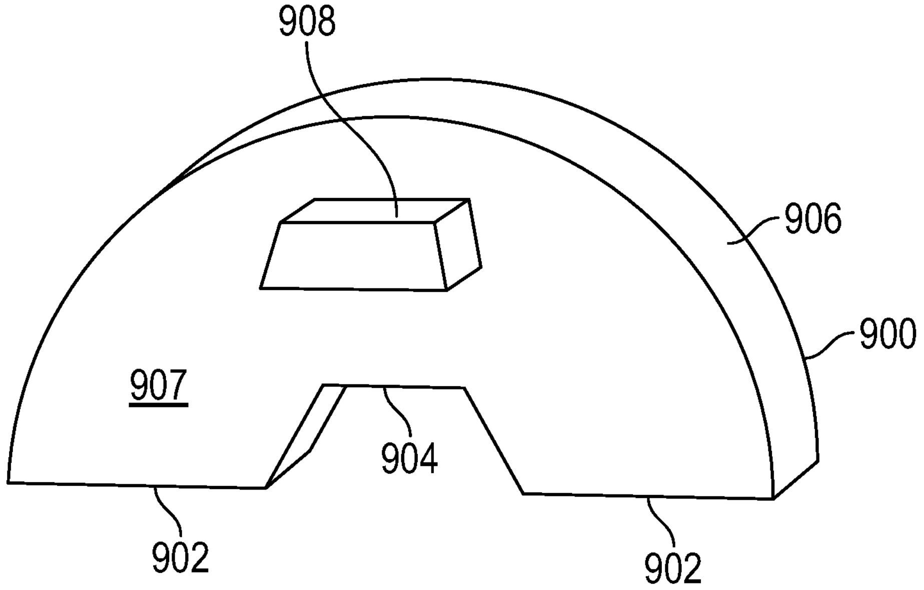
FIG. 13 is a front, top, side view of an implementation of an attachment of a hand tool system.

An attachment that could be used with this type of hand tool is shown in FIG. 13. Attachment 900 includes several elements similar to those of other attachments, including a first surface 902 (which in the figure is flat), a recess 904 recessed from the first surface which forms a shape of half of a regular hexagon or half of a regular hexagonal prism (from a two-dimensional or three-dimensional perspective, respectively), and a second surface 906 that is rounded (such that, when two attachments 900 are in a closed configuration, the rounded surfaces together form a shape of a cylindrical sidewall). Attachment 900 differs from other attachments in that, instead of including a void, it includes a projection 908 extending outward from a sidewall 907 of the attachment. The projection is seen to have a shape of a regular trapezoid or regular trapezoidal prism (from a two-dimensional or three-dimensional perspective, respectively), but as with other attachments, other shapes are possible. The shape of the projection is configured such that the projection can be coupled with the coupler or cavity 606, in a friction fit, to selectively couple the hand tool 600 and attachments 900 together.

It is pointed out that, while protrusions/couplers are shown on one side of each respective hand tool, the projecting couplers could instead be on the other side (i.e., the other sides of the jaws), or protrusions/couplers could be included on both sides (i.e., extending from opposing sidewalls) of each jaw, if desired, though having protrusions/couples on both sides may be inconvenient in some circumstances where a user is desiring to use the hand tool system and where the protrusions on either side get in the way of a rotational movement or otherwise hinder a rotational motion or hinder coupling the hand tool system with, or decoupling it from, a nut or fastener head or the like.

Figure 9:
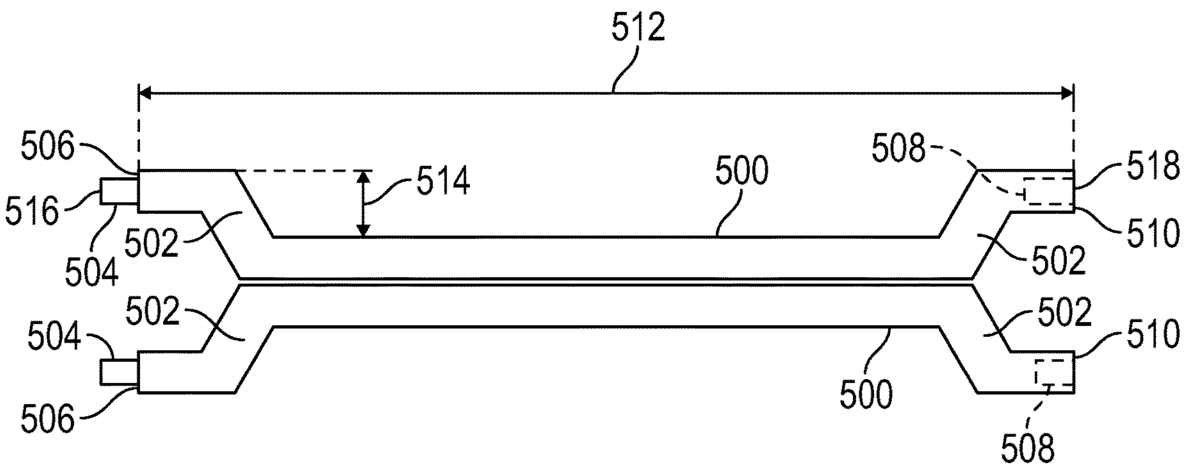
FIG. 9 is a side view of two implementations of extensions of a hand tool system.

Referring now to FIG. 9, another implementation of an extension is shown. FIG. 9 actually shows two extensions 500. Each extension 500 includes two bends 502 such that a distance 514 is formed between portions of the extension. This distance 514 could be modified as desired for various implementations and use cases. Each extension includes a projection 504 on one end and a hollow 508 on the other end. These may have the same shapes as protrusions/projections or hollows/cavities described herein for other elements, such that one end can couple to a hand tool and another can couple to an attachment. The extensions may be used in duplicate so that one extension attaches to an upper jaw of a hand tool and to a first attachment while the other extension attaches to a lower jaw of the hand tool and to a second attachment. Other configurations are possible, such as each extension having two projections, or each extension having two hollows, instead of each having a projection and a hollow. The main body of each extension may have a cylindrical shape, or a rectangular cuboidal shape, or any other shape.

The use of two extensions aligned as shown in FIG. 9 results in a smaller rotational diameter proximate a center of the extensions than at the ends of the extensions. This may be useful for instances in which there is a narrow opening between the hand tool and the item to be tightened/loosened, such that fully straight extensions may have a combined or overall diameter (or rotational diameter) too large to fit within the narrow opening (or too large to rotate within the narrow opening), whereas the reduced rotational diameter of extensions 500 allows extensions 500 to fit within the narrow opening and to rotate therein for tightening/loosening operations. The bends may have different shapes and configurations than those shown in FIG. 9, which simply shows one example configuration.

Each extension 500 has a length 512, which may be modified as desired for different situations or use cases. Extension 500 includes a stop 506 on one end and a stop 510 on the other end. These have similar functions as the stops of extension 400, described above. The presence of the bends in each extension offsets a portion of the extension such that no straight line passing through terminal ends 516, 518 of the attachment would pass through the offset portion, as can be envisioned by viewing FIG. 9. In other implementations the offset portion could be offset less, such that a straight line which passes through the terminal ends would at least partially pass through the offset portion. However, forming the extensions so that they are offset more, such that a straight line which would pass through the terminal ends would not pass through the offset portion, may in implementations allow for a narrower central area of the extensions such that the extensions can fit through narrower areas or openings.

Figure 11:
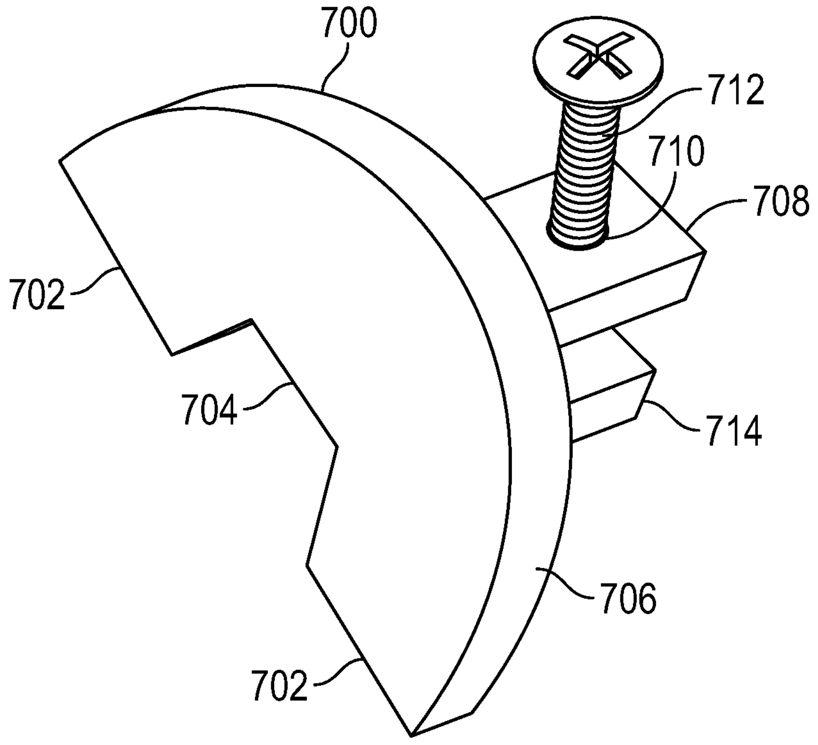
FIG. 11 is a front, top, side view of an implementation of an attachment of a hand tool system.

Another attachment type is shown in FIG. 11. Attachment 700 is in some ways similar to other attachments, having a first surface 702 (which is seen in FIG. 11 to be flat), a recess 704 recessed from the first surface which forms a shape of half of a regular hexagon or half of a regular hexagonal prism (from a two-dimensional or three-dimensional perspective, respectively), and a second surface 706 that is rounded (such that, when two attachments 700 are in a closed configuration, the rounded surfaces together form a shape of a cylindrical sidewall). Attachment 700 differs from other attachments in that, instead of including a projection/protrusion or cavity/hollow in its sidewall, it includes elements which form a clamp. The clamp is used to clamp to a hand tool jaw which itself includes no protrusion/projection or opening/hollow/cavity. The clamp is formed by a first extension 708 extending from a sidewall of the attachment (the first extension having a passage 710 therein, which in FIG. 11 is threaded), a tightening member 712 (which in FIG. 11 is a threaded fastener, or a screw) threaded through the passage, and a second extension 712 also extending from the sidewall of the attachment.

The first extension and second extension in FIG. 11 are parallel or substantially parallel relative to one another (and are also perpendicular or substantially perpendicular from the attachment sidewall). Other configurations are possible though—the first and second extensions could have curved shapes to match upper curvature and lower curvature of a hand tool jaw, for example. They could additionally be offset from being parallel (or offset from being substantially parallel), such as to match a portion of a jaw where the upper and lower surfaces of the jaw are not parallel (or are not substantially parallel). Additionally, the extensions of FIG. 11 are seen to have a rectangular or rectangular cuboid shape, but this is only one example and other options are possible. Further, other clamping mechanisms are possible than that shown in FIG. 11. In FIG. 11 the screw itself approaches the second extension when tightened, so as to clamp a jaw between the bottom of the screw and the second extension. In other implementations a screw could cause one of the extensions to move in one direction or another depending on rotation direction of the screw (the respective extension being slidably coupled with the attachment sidewall and the screw otherwise vertically fixed in place) such that the jaw is clamped between the two extensions, not between the screw and an extension. Other configurations are possible for the clamp or clamping mechanism, and those disclosed herein are only representative examples.

As described, the clamp or clamping mechanism is useful to allow attachment 700 to attach to, or clamp onto, a jaw which does not include a coupler/protrusion/cavity. Thus, attachment 700 is useful for being able to be used with standard or traditional hand tools, such as standard or traditional pliers, standard or traditional wrenches, and so forth.

Figure 12:
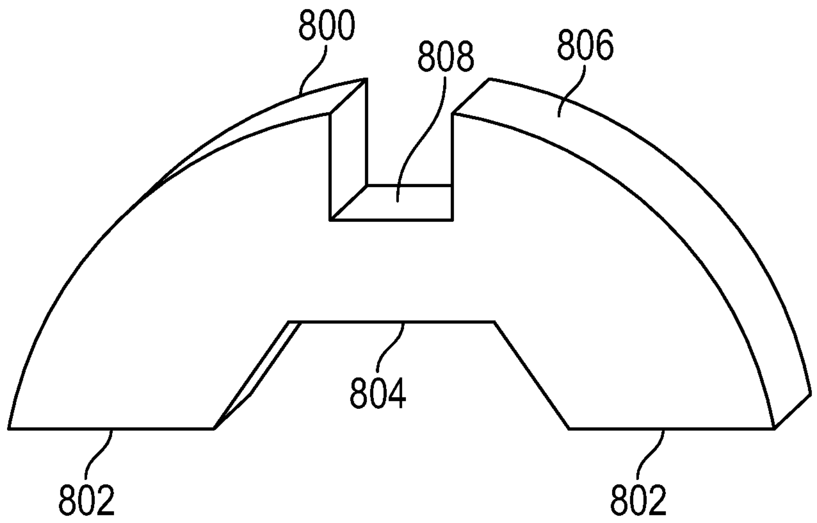
FIG. 12 is a front, top, side view of an implementation of an attachment of a hand tool system.

FIG. 12 shows an attachment 800 which is in some ways similar to other attachments but in some ways different. Attachment 800 has a first surface 802 (which is seen in FIG. 12 to be flat), a first recess 804 recessed from the first surface which forms a shape of half of a regular hexagon or half of a regular hexagonal prism (from a two-dimensional or three-dimensional perspective, respectively), and a second surface 806 that is rounded (such that, when two attachments 800 are in a closed configuration, the rounded surfaces together form a shape of a cylindrical sidewall). Attachment 800 differs from other attachments in that, instead of including a projection/protrusion or cavity/hollow in its sidewall, it includes a second recess or groove 808. Attachment 800 may be used together with hand tool 102 which has trapezoidal protrusions 108 (or a hand tool having protrusions of a rectangular shape or any other shape) so long as there is magnetic attraction between the protrusion and the attachment 800. This may be accomplished by one of the elements being magnetic and the other being a magnetizable metal, or both being magnetic, as examples. Magnetic materials such as magnetic metals or magnetic ceramics or composites may be used. A second recess may be used, instead of a void or cavity or hollow in the sidewall of the attachment, in implementations wherein the hand tool does not need to exert much opening force to open two closed attachments to an opening configuration (which may be the case in most settings). Thus, having the second recess open, instead of a cavity or void fully circumscribed within the attachment, is workable because upon an opening motion the magnetic attraction keeps the protrusion or coupler of the jaw coupled within the second recess.

In some implementations the attachment 800 could be magnetic but the hand tool could be neither magnetic nor magnetizable. Such a configuration may allow the attachments to be magnetically coupled around a nut or threaded fastener head and remain fixed thereon even when the hand tool is not coupled with the attachments. The hand tool may be placed in a location proximate the attachments and closed so as to insert the protrusions of the jaws into the second recesses from the top and bottom, respectively—or the hand tool may first be closed and then the protrusions inserted into the second recesses from the sides. The attachments may then be rotated to tighten/loosen the nut or threaded fastener head. The hand tool may then be opened to disconnect from the attachments, repositioned, and closed to reconnect to the attachments—or slid out of the second recesses to disconnect from the attachments while the hand tool remains closed, repositioned, and slid in the second recesses while the hand tool remains closed to reconnect to the attachments—to get a different rotational position in preparation for another rotational movement.

Such steps can be repeated for repeated tightening or loosening in a given direction. This allows for continued repeated rotations even in tight spaces where a full 360-degree rotation (or lesser rotation) is not possible. For attachments which include a cavity or void, instead of a second recess, such repeated rotations may be accomplished by rotating the hand tool system in the closed configuration for a tightening or loosening motion, opening the hand tool system and rotating it in the opposite direction, then closing it and rotating it again in the first rotation—repeated as many times as necessary. The method of rotating in one direction when in a closed configuration, sliding the protrusions of the jaw out from the side of the attachment and rotating in the other direction (while remaining in the closed configuration), then sliding the protrusions back into the attachment (while remaining in the closed configuration) and rotating in the first direction again, can be accomplished with attachments which include cavities or voids instead of second recesses so long as the attachments are magnetic (to stay attached to the nut or fastener head) or are otherwise secured to the nut or fastener head.

Figure 14:
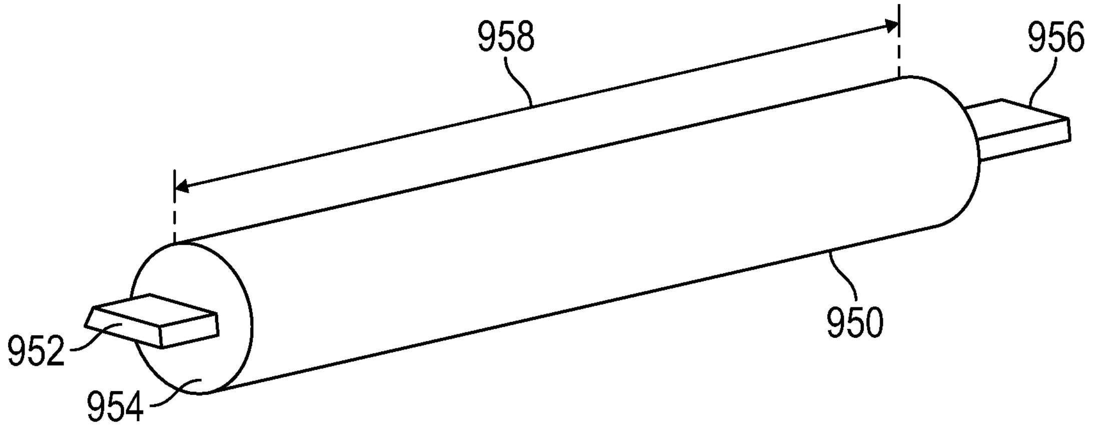
FIG. 14 is a front, top, side view of an implementation of an extension of a hand tool system.

FIG. 14 shows an extension 950 which is in many ways similar to extension 400 except that it includes two projections 952 and 956 instead of a projection and a hollow. Extension 950 can accordingly be used in a situation where the coupler of the jaw is a cavity or void or hollow and where the attachment similarly includes a cavity or void or hollow. Such projections 952/956 can also be used with attachments having second recesses, though, so long as one member is magnetic for the type of functionality described above. Extension 950 includes stop 954 on one end and another stop on the other end, which perform the same functions as other stops described with respect to other extensions herein. Extension 950 has a length 958 which may be modified as desired for different situations or use cases. As with any other extensions described herein, extension 950 may be combined with other extensions (such as the same type of extension—with an adapter between each extension—or with extensions of another type) for achieving increased length or distance between the hand tool and the nut or threaded fastener head. As with other extensions and elements, the diameter and shape of the extension may be modified as desired for different situations and use cases.

Figure 15:
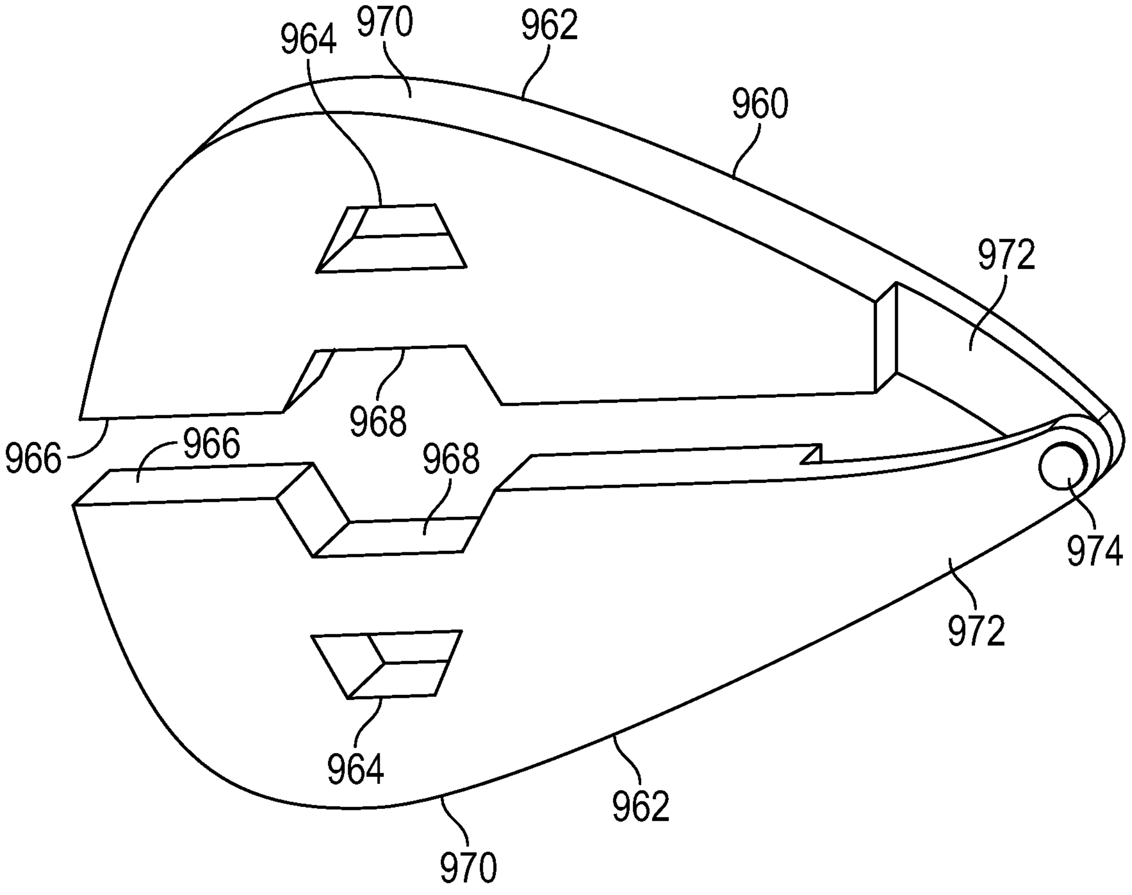
FIG. 15 is a front, top, side view of an implementation of an attachment system.

Referring to FIG. 15, in implementations an attachment system 960 includes two matching attachments 962 each of which includes a void 964 (or other coupler as described herein for other attachments), a first surface 966 with a recess 968 therein, and a second surface 970 which is at least partially rounded—these elements have similar or the same functions and advantages as those described herein for other, similarly-named and/or similarly shaped/configured elements of other attachments. The attachments 962 are different from other attachments described herein in that they are also rotatingly coupled to one another, such as with a pivot 974. This may be done with arms 972 which extend from main bodies of the attachments and which are themselves fixed together with pivot 974. In some implementations such arms and pivot could have a similar or identical configuration as portions of the jaws and the pivot of the hand tool of FIG. 1 (with the levers excluded), though they may also have different configurations.

The pivot 974 may in implementations align with the pivot of the hand tool so that when the attachment system is coupled with a hand tool the attachment system opens and closes, together with the jaws, without any issue. The arms 972 and pivot 974 may be positioned to the side of the hand tool so as to not contact or obstruct the jaws or pivot of the hand tool during operation.

Having attachments 962 coupled together with pivot 974 allows the attachments to be used as normal but also keeps matching or corresponding attachments together, so that a user does not need to search for one attachment and then search for its matching or corresponding attachment (in other words, an attachment with a matching or corresponding recess) when trying to find the right sized and shaped attachments. Instead, upon finding one attachment, the matching or corresponding attachment is coupled thereto already. This reduces time and effort for the user while using the hand tool systems. The attachments of attachment system 960 need not be matching in the sense that the recesses are identical, but may only be corresponding instead of matching. In other words, the two recesses may be shaped so that when joined they match a shape of a fastener head or are otherwise configured to snugly grip a fastener head without the recesses having identical or matching configurations. In other implementations the attachments may be matching, as in FIG. 15, such that the recesses of each match and are identical or substantially identical. An attachment system with arms and pivot may also include teeth and/or other elements described herein for other attachments.

Instead of removable attachments, some hand tool systems could simply include protrusions or projections extending from jaw sidewalls but which are fixed and not removable. This may be useful for allowing even tighter gripping, though the user may need more hand tool systems in such a situation, with varying recess shapes and sizes, as opposed to having a variety of attachment types and attachment sizes. The protrusions extending from the sidewalls of the jaws may be integrally formed with the jaws, such that they are not manually removable therefrom, but may otherwise form shapes similar or identical to attachments shown in the drawings. The practitioner of ordinary skill in the art will accordingly know how to form such hand tool systems, by integrally forming the protrusions with the jaws, without these versions being specifically depicted in the drawings.

In the drawings the couplers of the jaws are shown as being generally centered in the jaws, but they could be in other locations such as further towards the terminal ends of the jaws or closer towards the pivot or even on or at or in the pivot or on or at or in the levers or handles.

In the drawings, closed attachments are shown to have, combined, roughly the diameter of the jaws in a closed position. In implementations they could have a different combined diameter in a closed position, however, such as a greater diameter (even much greater) than the combined diameter of the closed jaws or a smaller diameter (even much smaller) than the combined diameter of the closed jaws.

Another implementation of a hand tool system, not shown in the drawings, could include a ratchet with two couplers/protrusions and a two-piece socket. The two-piece socket could include a hose clamp or other clamping member encircling it to allow tight clamping of the two-piece socket around a nut or threaded fastener head or other element. The couplers/protrusions and voids of the two-piece socket may fit together relatively loosely such that some motion or movement of the installed two-piece socket is possible, allowing tightening of the two-piece socket with the hose clamp or other clamping member. The two-piece socket may simply be two attachments, such as any attachments shown in the drawings, or some variation thereof. Such a two-piece socket and clamp member may also be used with a hand tool having jaws, instead of with a ratchet.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C"

shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of hand tool systems and devices and related methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget"), then the claim does not require a "first" (or so on) of that element.

Method steps disclosed anywhere herein, including in the claims, may be performed in any feasible/possible order. Recitation of method steps in any given order in the claims or elsewhere does not imply that the steps must be performed in that order—such claims and descriptions are intended to cover the steps performed in any order except any orders which are technically impossible or not feasible. However, in some implementations method steps may be performed in the order(s) in which the steps are presented herein, including any order(s) presented in the claims.

What is claimed is:

1. A hand tool system, comprising:

a hand tool comprising:

- a first rigid member comprising a first lever and a first jaw;
- a second rigid member comprising a second lever and a second jaw;
- a pivot rotatingly coupling the first rigid member with the second rigid member;
- a coupler comprising a protrusion extending from a sidewall of one of the jaws;

an attachment configured to selectively couple with the coupler, the attachment comprising a recess and further comprising a void having a shape matching a shape of the protrusion; and an extension having a hollow and a projection, the hollow having a shape matching a shape of the protrusion and configured to couple therewith, the shape of the projection matching the shape of the void and configured to couple therewith.

2. The hand tool system of claim 1, wherein the recess forms a shape of half of a regular hexagon.

3. The hand tool system of claim 1, wherein the protrusion forms a polygonal shape.

4. The hand tool system of claim 1, wherein the coupler comprises the protrusion, wherein the attachment comprises a second recess, and wherein the protrusion and the attachment are magnetically attracted such that they are configured to magnetically couple with one another until separated by manual force.

5. The hand tool system of claim 1, wherein the recess of the attachment comprises a plurality of teeth.

6. The hand tool system of claim 5, wherein at least one of the teeth is at least partially formed of a polymer.

7. The hand tool system of claim 5, wherein at least one of the teeth includes a clamping edge and a raised portion extending from the clamping edge, the raised portion configured to contact a bottom of a nut while the clamping edge is contacting a side of the nut.

8. The hand tool system of claim 1, further comprising a retaining member slidingly coupled with the attachment and configured to be locked at multiple positions using a tightening member.

9. A hand tool system, comprising:

a hand tool comprising:

- a first rigid member comprising a first lever and a first jaw;
- a second rigid member comprising a second lever and a second jaw;
- a pivot rotatingly coupling the first rigid member with the second rigid member;
- a coupler comprising a protrusion extending from a sidewall of one of the jaws;

an attachment configured to selectively couple with the coupler, the attachment comprising a recess and a void; and an extension configured to couple with the coupler and with the attachment, the extension comprising:

- a hollow configured to couple with the protrusion;
- a projection configured to couple with the void; and
- a plurality of bends offsetting a portion of the attachment such that no straight line passing through terminal ends of the attachment would pass through the portion.

10. A hand tool system, comprising:

a hand tool comprising:

- a first rigid member comprising a first lever and a first jaw;
- a second rigid member comprising a second lever and a second jaw;
- a pivot rotatingly coupling the first rigid member with the second rigid member; and
- a protrusion extending from a sidewall of the first jaw and comprising a recess, recessed from a flat surface, forming a shape of half of a regular hexagon;

wherein the protrusion is selectively manually removable from the first jaw and comprises a removable attachment; and wherein the removable attachment includes a clamp comprising: a pair of extensions distanced sufficiently from one another to receive the first jaw therebetween; and a tightening member configured to be rotated to secure the removable attachment to the first jaw.

* * * * *